May 28, 1940. E. V. COLLINS 2,202,091
DAMMING DEVICE
Filed Sept. 11, 1937 3 Sheets-Sheet 1
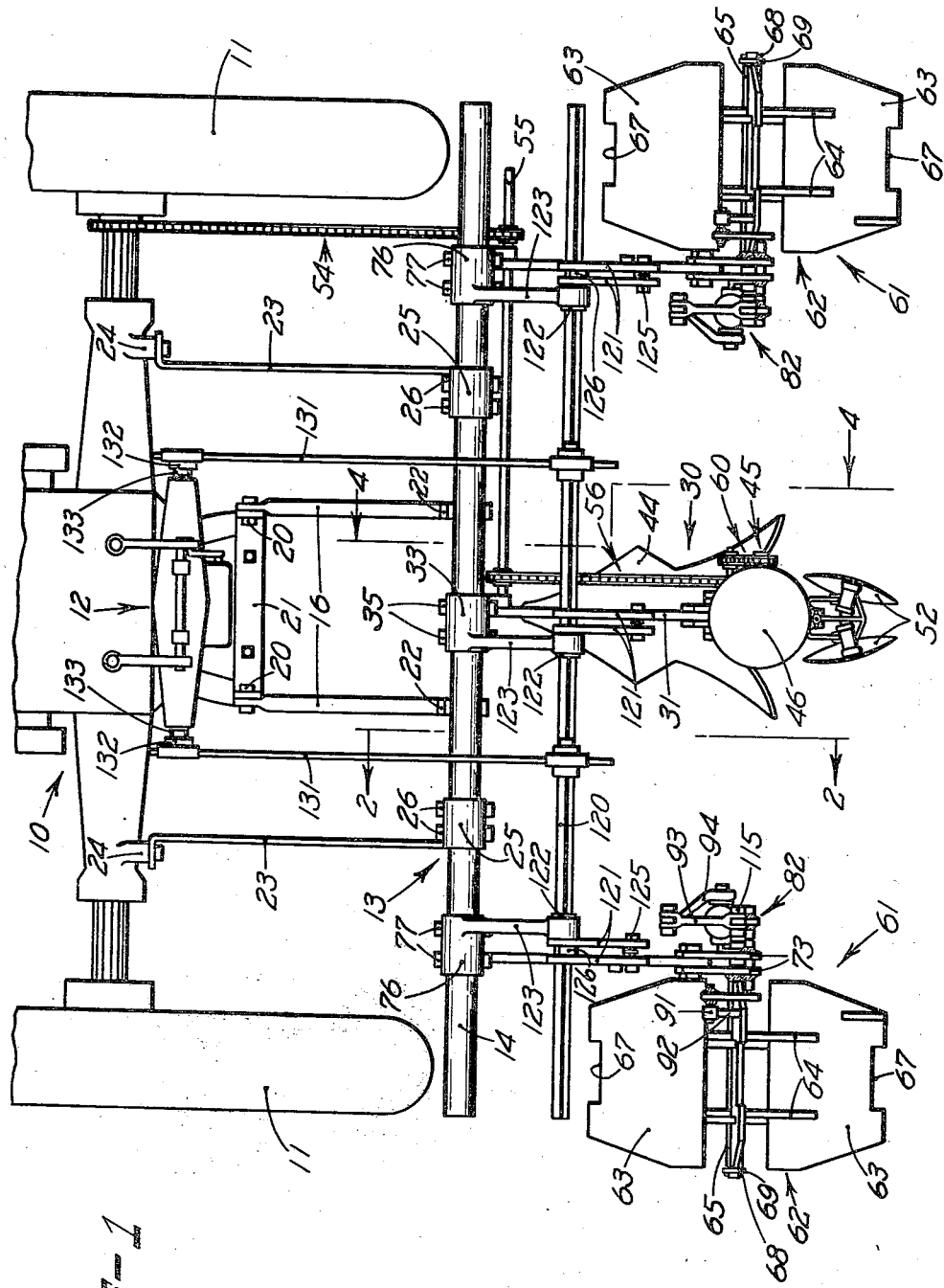
INVENTOR
EDGAR V. COLLINS
BY
E. Bopf and C.T. Parker
ATTORNEYS May 28, 1940.  E. V. COLLINS  2,202,091
DAMMING DEVICE
Filed Sept. 11, 1937  3 Sheets-Sheet 2
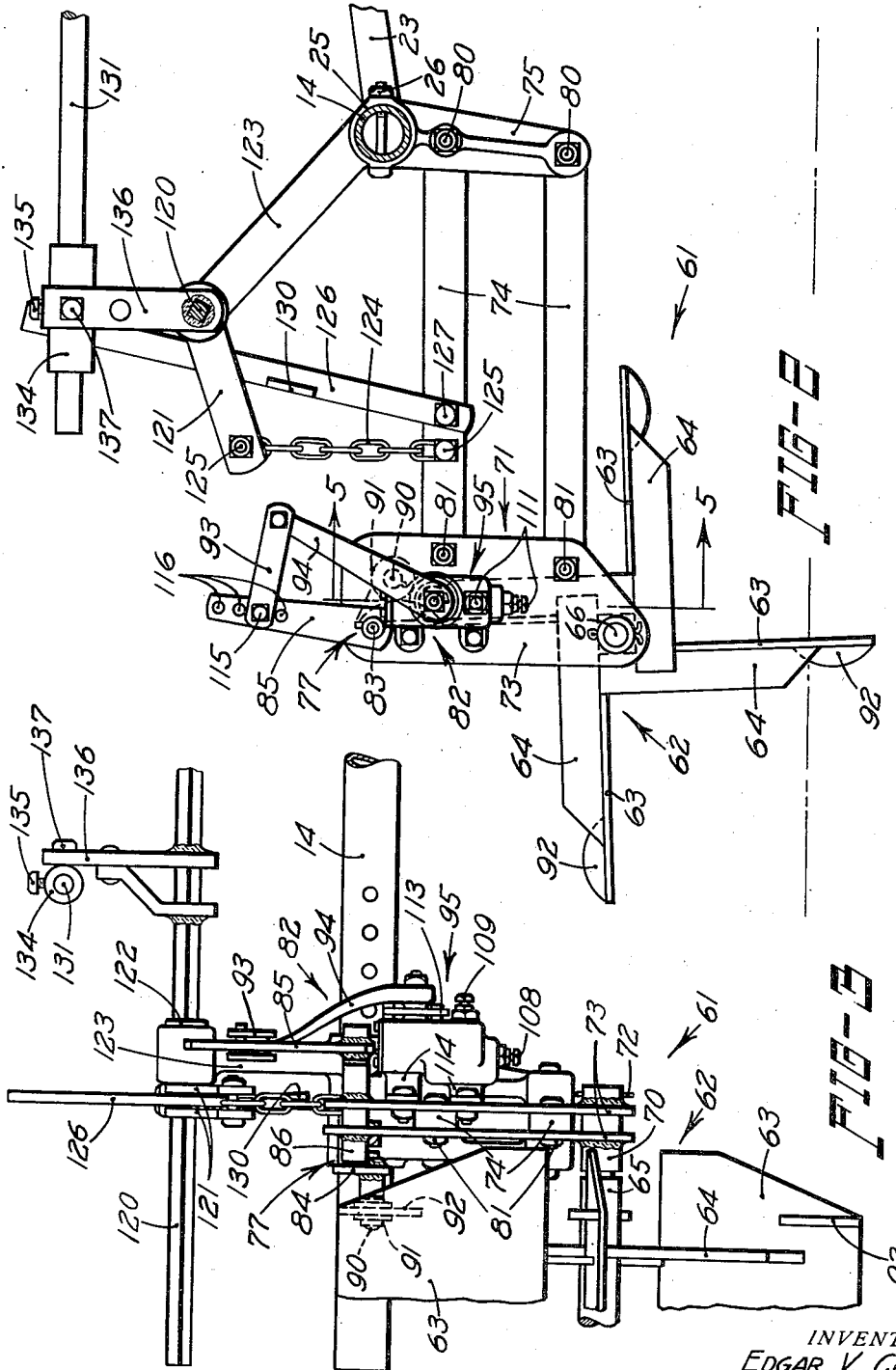
INVENTOR
EDGAR V. COLLINS
BY
ATTORNEYS

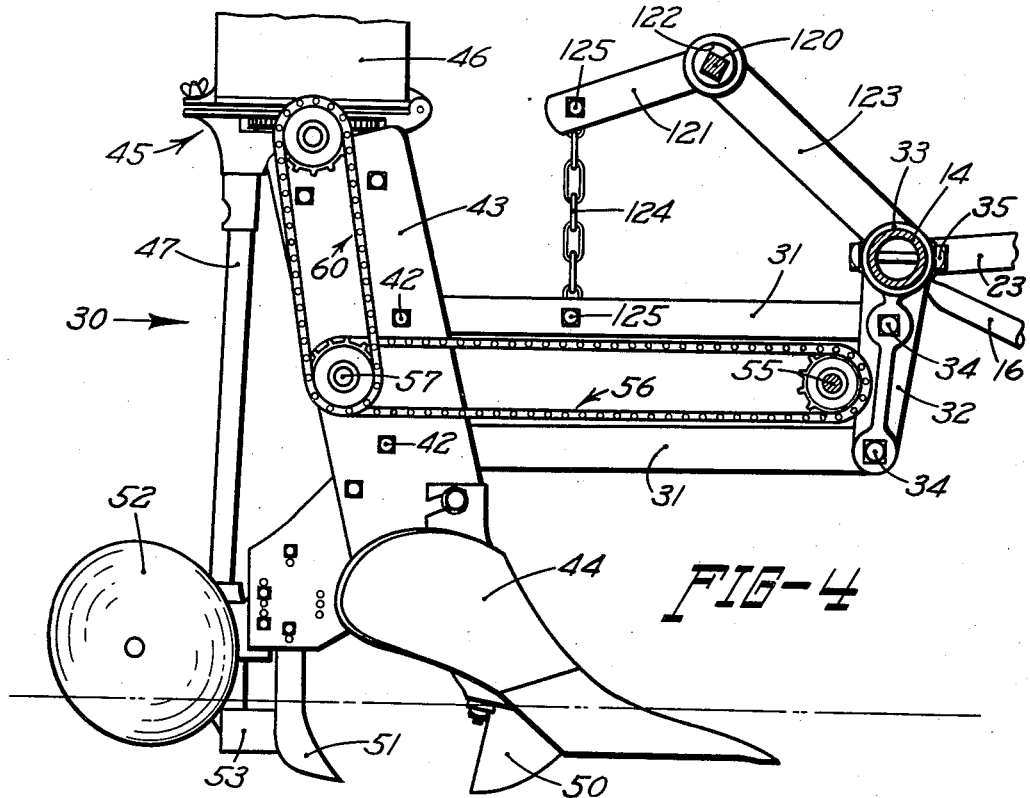
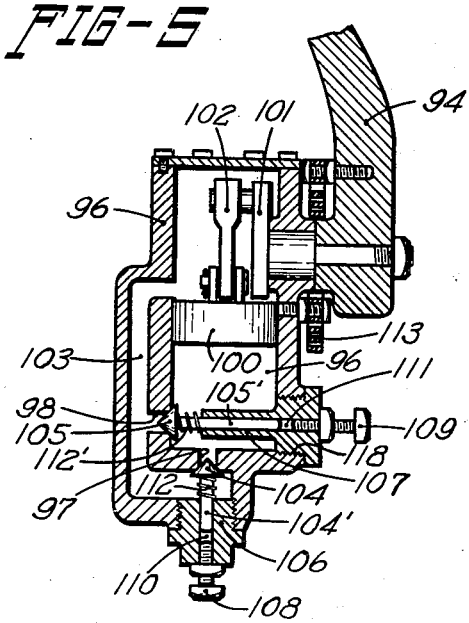

Patented May 28, 1940

2,202,091

UNITED STATES PATENT OFFICE 2,202,091

DAMMING DEVICE

Edgar V. Collins, Ames, Iowa, assignor to Deere & Company, Moline, Ill., a corporation of Illinois Application September 11, 1937, Serial No. 163,430

33 Claims. (Cl. 97—55)

The present invention relates to damming devices of the farm implement type used in conjunction with a furrow forming tool, usually a middlebreaker or lister, to accumulate earth from the sides of the furrow and deposit the same at spaced intervals across the furrow, forming dams. Moisture retained in the basins thus formed is conserved for future plant use, and surface runoff, with its attendant erosion, is retarded. In its preferred embodiment, the present invention relates to damming devices of the dash pot controlled type similar to that disclosed in my copending application, Serial No. 127,346, filed February 24, 1937, wherein each rotatable assembly of radially disposed blades is restrained against rotation by a spring-backed dash pot. Pressure of accumulated soil in front of the earth engaging blade as the implement moves forwardly, causes the control device to yield and release the blade assembly for rotation, thereby depositing the soil to form a dam.

Heretofore damming devices have been adapted for use only in combination with two or more tractor drawn furrow cutting tools, in which separate damming devices are attached immediately behind the furrow forming tools. It has been impractical to use a damming device behind a single tractor drawn furrow forming tool located centrally of the tractor, because of the necessity for running one wheel of the tractor in the last furrow formed to secure proper spacing of the furrows. The dams lying across the furrow would thereby be destroyed by the wheel running over them. An object of this invention, therefore, is to provide a dam forming attachment adapted for use with a single tractor drawn furrow forming tool, whereby the dams are formed in the furrow after the tractor wheel has traveled through it.

When the damming device is used in combination with a single lister drawn by a rubber tired tractor, the tractor wheel also serves to tamp down soil on the seed, thereby securing an improved seed bed and also protecting the seed against disturbance by the scraper blades of the dam forming device as they pass over.

Another object is to provide a unitary, self contained damming device controlled by a dashpot, as disclosed in my above-mentioned co-pending application, but in which the dams are spaced substantially equidistant regardless of varying speeds at which the tractor may be run. Experiments have proved that soil resistance against the scraper blades increases at a rate less than directly proportional to the speed of forward movement of the damming device. Therefore, if the device is adjusted to space dams at a certain distance apart when the tractor is run at half speed, the dams will be too far apart when the tractor is run at full speed, due to the time delay caused by the action of the dash pot. Soil conditions frequently are such that one part of a field must be traversed at a slower speed than another part, but it is desirable to have a uniform spacing of dams in the furrows.

In order to secure the same linear spacing of dams at higher speed as are secured at a lower speed, means have been provided for tripping the scraper blades at shorter time intervals as the speed is increased.

These and other objects and advantages of my invention will be made apparent from a consideration of the following detailed description of an embodiment of my invention, reference being had to the drawings appended hereto, in which Figure 1 is a plan view of a tractor mounted lister provided with a damming device embodying the features of my invention.

Figure 2 is a sectional side view, taken along the line 2—2 of Figure 1.

Figure 3 is a fragmentary rear view of the damming device showing the details of the detent mechanism.

Figure 4 is a sectional side view, taken along the line 4—4 of Figure 1, showing the lister and the manner of mounting upon the draft frame, and Figure 5 is a sectional end view, taken along the line 5—5 of Figure 2, of the detent mechanism.

Referring now to the drawings, the implement is mounted on the rear end of a tractor 10 having rubber tired traction wheels 11 and a power lift mechanism 12. The implement draft frame, indicated generally by the reference numeral 13 comprises a transversely extending beam comprising a pipe member 14 disposed to the rear of the tractor 10 and supported thereon by means of two laterally spaced, forwardly and downwardly extending supporting beams 16 which are bolted at their forward ends to the draft frame 21 of the tractor, their rear ends being connected to the beam 14 by bolts 22. Further bracing of pipe member 14 is secured by means of two forwardly extending bracing rods 23, the forward ends of which are bent at right angles and bolted to bosses 24 raised on the frame of the tractor. The rear ends of bracing rods 23 are fixed to sleeves 25, adapted to fit over pipe member 14 and fixed thereon by means of bolts 26 passed through aligned holes in pipe member 14.

Spaced midway between the traction wheels 11 is a lister, indicated generally by the reference numeral 30, which is connected to pipe member 15 by means of a pair of vertically spaced parallel draft arms 31. The forward ends of the latter are connected by pivot bolts 34 to a downwardly extending arm 32 rigidly fixed to a sleeve 33 which is adapted to fit over the pipe member 14 and bolted thereto by means of bolts 35 passed through aligned holes. The rear ends of the parallel draft arms are connected by pivot bolts 42 to a standard 43 on which are mounted the double moldboard lister bottom 44, the seed dropping mechanism 45, and the seed hopper 46. Seed is dropped down a spout 47 into the furrow opened up by the bottom 44, root cutter 50, and subsoiler 51, and is covered by two trailing disk shovels 52. An apron 53 extends rearwardly from subsoiler 51 on both sides of the bottom of spout 47, holding loose soil out of the furrow until the seed has settled on the bottom.

Power for operating the seed dropping mechanism is derived from the right wheel axle of the tractor and is transmitted through a sprocket and chain drive 54 to a transverse drive shaft 55. A second sprocket and chain drive 56 on the opposite end of drive shaft 55, transmits the power back to a spindle 57 on the standard 43, and a third drive 60 delivers the power from the spindle 57 to the seed dropping mechanism.

Disposed directly behind each of traction wheels 11 is a unitary damming device indicated in its entirety by the reference numeral 61, comprising a rotatable scraper assembly 62 which includes a plurality of scraper blades 63 (four, in the embodiment shown), extending radially outward from a transverse axis of rotation. Each of the blades is tapered to conform to the sides of the furrow and the outer edge is provided with a recess 67 to allow ample clearance of the blades over the seed in the bottom of the furrow. Each blade is supported on a pair of laterally spaced arms 64, which are fixed, as by welding, to an axially disposed pipe 65 which is journaled on a shaft 66. The shaft 66 extends laterally beyond one end of the pipe 65 and through a sleeve 70, which is welded to a supporting frame 71. The shaft 66 is fixed to the sleeve 70 by means of a pin 72 passed through aligned holes in both the sleeve and shaft. The pipe 65 is held on the shaft 66 by a washer 68 secured on the shaft by a pin 69.

The supporting frame 71 comprises a pair of laterally spaced plates 73 connected by two vertically spaced, forwardly extending parallel draft arms 74 to a downwardly extending arm 75 of a sleeve member 76 which is fixed on pipe member 14 by means of two bolts 77 passed through aligned holes in the pipe and sleeve member. The forward ends of parallel arms 74 are pivotally connected to arm 75 by pivot bolts 80, while the rear ends are likewise pivotally connected to the supporting frame 71 by pivot bolts 81. Thus the damming device is free to move vertically relative to the draft frame 13 while maintaining the same angular position relative to the ground.

The rotatable scraper blade assembly 62 is held with one of the blades 63 in earth engaging position by means of a detent mechanism, indicated generally by the reference numeral 82. A detent member 77 comprising a transversely disposed rock shaft 83 having arms 84 and 85 fixed on opposite ends, is journaled in a sleeve 86 which extends through and is fixed, as by welding, to the parallel plates 73 of the supporting frame 74. A stub shaft 90 on which is journaled a roller 91 is fixed on the opposite end of crank arm 84 and extends laterally therefrom. Roller 91 engages a cam 92 fixed on the back face of each blade 63, to hold the rotatable blade assembly against rotation as the damming device is drawn forwardly over the ground.

At its outer end, lever arm 85 is connected by means of a link 93 to an arm 94 of a double-acting dashpot, indicated generally by the reference numeral 95. Dashpot 95, shown in section in Figure 5, comprises a cylinder 96 preferably containing a liquid such as oil, although air or other gaseous fluid might be used. A piston 100 operates in the cylinder and is actuated through a pitman 102 by a crank 101 fixed on a shaft 99 which is rigidly connected to the arm 94. Movement of the piston causes the fluid in which it operates, to flow from one side of the piston to the other through a passage 103, and through apertures 97, 98 restricted by valves 104 and 105, which seat in the apertures 97, 98, respectively. One of the valves 104 seats in the outer end of the opening 97, thus preventing flow of oil into the cylinder, but is adapted to yield to oil pressure within the cylinder, as will be explained shortly, to permit oil to escape therefrom. The other valve 105 seats in the inner end of its associated aperture 98 and is adapted to prevent flow of oil out of the cylinder but to yield to an external pressure to permit oil to flow from the passage 103 into the cylinder 96. The escape valve 104 is fixed on a valve stem 104', which is axially slidable in a guide member 106 having a centrally disposed tubular opening 110 to receive the valve stem 104'. The valve 104 is normally held against its seat by means of a coil spring 112 embracing the stem and reacting against the guide member 106. The guide member 106 is inserted through a threaded opening 118 in the external wall of the passage 103 and secured therein by cooperative threads.

The inlet valve 105 is similarly mounted on a stem 105', slidably supported within a tubular opening 111 in a guide member 107, which is inserted through a threaded opening 118 in the wall of the cylinder and secured by threads cooperating with the opening 118. A coil spring 112' embracing the stem 105' acts to hold the valve 105 on its seat and reacts against the end of the guide member 107.

The resistance of the escape of oil from the cylinder 96 is adjusted by means of a set screw 108, threaded into the tubular opening 110 of the guide member 106. The set screw determines the limit of outward travel of the valve 104 by engaging the end of the valve stem, thus determining the amount of restriction of the aperture 97 by the valve 104. A similar set screw 109, threaded into the opening 111, limits the extent of travel of the inlet valve 105 and thus controls the resistance to the flow of oil into the cylinder. Hence by adjustment of the respective set screws, the speed of rotation of the arm 94, for a given force acting against the latter, can be independently adjusted in each direction of rotation.

The dash pot arm 94 is moved in one direction by the resistance of the soil to forward movement of the damming blade acting against the roller 91 through the cam 92. As the pressure against the blade 63 is increased by the accumulation of soil scraped from the sides of the furrow, the cam 92 bears against the roller 91 of the detent member 77, rotating the latter in a counter-clockwise direction, as viewed in Figure 2, and turning the dash pot arm 94 against the combined resistance of a coil spring 113, which is connected between the arm 94 and the housing 96, and the displacement of fluid in the cylinder by the downward movement of the piston 100. When the pressure against the blade has increased sufficiently to force the roller out of engagement with the cam 92, the scraper blade assembly is released and permitted to rotate. The scraper blade carrying the accumulated earth is thus disabled and deposits its load of soil across the furrow to form a dam. The coil spring 113 returns the dash pot arm 94 toward its normal position as soon as the pressure is released, and the detent mechanism engages the cam 92 on the following blade, again holding the scraper blade assembly against rotation and with one blade in ground engaging position. Cam 92 is so shaped that the angle between the crank arm 84 and a line tangent to the cam surface at the point of contact with the roller 91 remains substantially constant throughout the range of movement of the roller 91, thereby insuring a uniform angular movement of the detent member 77 under a uniform rate of increase of pressure of the blades against the roller 91. The mechanical advantage of the dashpot mechanism can be varied by connecting the link 93 with the lever arm 85 either closer to or further away from its axis of rotation, by inserting the bolt 115 through one of several perforations 116 in the lever arm.

In operation, the blades 63 of the damming device engage the furrow in which the tractor wheel runs, scraping soil from the sides until sufficient has been accumulated to form a dam across the furrow. When the pressure of the scraper blade assembly against the detent mechanism has become sufficient to overcome the resistance of the dashpot, and the roller 91 is disengaged from the cam 92, the scraper blade assembly is permitted to rotate and deposit the accumulation of soil across the furrow. As soon as the pressure against the roller 91 is relieved, the detent mechanism is returned to normal position by the coil spring 113, and the succeeding blade is engaged by the roller.

The spacing between dams is regulated by adjusting the set screws 108 and 109 on the dashpot. The first adjustment is made on the escape valve set screw 108 which regulates the resistance of the dashpot mechanism to the pressure of accumulated earth. By turning the set screw in, the valve opening is decreased, thereby increasing the resistance and spacing the dams farther apart. This adjustment should be made at the slow speed of the tractor and with the inlet valve 105 set for its maximum opening. The dam spacing at the high speed of the tractor is adjusted by adjusting the inlet valve set screw 109 with the tractor running at high speed. The object of this adjustment is to retard the return movement of the detent arm 94 so that the detent roller 91 is engaged by the cam 92 on the next succeeding blade before the arm 94 has completed its return stroke. The pressure of the cam 92 against the roller 91 arrests the return movement of the arm before it has completed its stroke, with the result that the time required, during the following periods of earth accumulation, to move the detent out of engagement with the cam is decreased. Thus by decreasing the time required to trip the detent at the higher speed of the tractor, the spacing of dams in the furrow at high speed operation can be made equal to the spacing at low speed operation. After the valves have once been adjusted for the two tractor speeds, no further attention is required, for when the speed of the tractor is changed from high to low speed, the damming device rotates at a slower rate thereby allowing sufficient time for the detent arm 94 to complete its entire return stroke, in spite of its retarded rate of movement. Hence, the retarded return movement is effective only when the tractor is operating at its higher speed.

Both damming devices and the lister 30 are lifted out of ground engaging position by the power lift mechanism 12 acting through a transversely disposed rock shaft 120, journaled in bearings 122 which are carried in the ends of rock shaft supporting arms 123, extending upwardly and rearwardly from the sleeve member 33 of the lister draft connection and the sleeve members 76 of the damming device draft connections. Fixed on the rock shaft 120 are lifting arms 121, one for each damming device and one for the lister, each lifting arm comprising a pair of members spaced apart to receive a chain 124 which is connected to the lifting arm and to the top parallel draft arm of its respective implement by bolts 125.

Only one damming device at a time will be in a position to operate, as the other one, mounted on the opposite side of the lister, will be over unlisted ground. When the tractor and implement are turned around at the end of the field and the listing resumed in the opposite direction, the relative positions of the two damming devices are reversed, and the one that was previously operating in a furrow is now carried over unlisted ground. Therefore, provision has been made for optionally holding either of the damming devices out of ground engaging position while it is carried over unlisted ground. This is accomplished by means of a detent bar 126, pivotally connected at its lower end by means of a pivot bolt 127 to the top parallel draft arm 74, and extending upwardly and forwardly between the pair of spaced members comprising the rock shaft lifting arm 121. A lug 130 is raised on one side of detent bar 126 and adapted to pass between the members 121 and hook over the top of one of them. As the lifting arm 121 is rotated clockwise, as viewed in Figure 2, the draft frame and damming mechanism are raised through the agency of the chain 124. The lower end of the detent bar 126 is raised through substantially the same vertical distance as is the lower end of the chain 124, but the lug 130, by virtue of its position adjacent the axis of rotation of lifting arm 121, is raised relative to the latter and passes through and hooks over one of the lifting arm members. When the rock shaft and lifting arms are rotated counterclockwise lowering the other implements into ground engaging position, the damming device which has been hooked to its lifting arm by means of the lug on the detent bar remains suspended by the detent bar and the chain 124 slackens. To lower the damming device once more, the rock shaft is again rotated clockwise, lifting the other two implements from the ground. The lug 130 is then manually held out of engagement with the lifting arm while the damming device is lowered by the power lift mechanism.

The rock shaft 120 is actuated by the power lift mechanism 12 through two laterally spaced, rearwardly extending tension rods 131, which are pivotally connected at their forward ends to lever arms 132 fixed on opposite ends of the power lift rock shaft 133, respectively. The rear end of each rod 131 engages a sleeve 134 and is fixed thereto by means of a set screw 135. The sleeve 134 is pivotally connected to one end of a forked lever arm 136 by a pivot bolt 137, and the opposite ends of the forked arm 136 are welded to the rock shaft 129.

The operation of the damming device is as follows:

The first furrow is turned by the lister 30 while both damming devices are held out of ground engaging position by means of their respective detent bars 126. At the end of the field the tractor is turned around and the tractor wheel on the side of the furrow is positioned to run in the furrow. The damming device behind the furrowward traction wheel is then lowered into ground engaging position and thus forms dams in the furrow behind the tractor wheel.

When the lister is used for planting, the tractor should be equipped with rubber tires, for steel wheels have a tendency to uncover the planted seed, while rubber tires tend to press the earth firmly upon the seed, resulting in an improved seed bed. Since the ends of the damming blades are notched to avoid disturbing the planted seeds, the dams can be formed in the planted furrow without damage to the seed bed.

I claim:

1. In an implement of the class described, for forming a single furrow with longitudinally spaced dams therein, the combination of an implement frame, a single furrow forming tool mounted thereon, and a damming device mounted on said implement frame and spaced laterally from said furrow forming tool, said damming device comprising a scraper blade member adapted to accumulate soil from the sides of a furrow, and means responsive to the pressure of the accumulated soil against said scraper blade for disabling the latter, to deposit said accumulation of soil across the furrow.

2. In an implement of the class described, for forming a single furrow with longitudinally spaced dams therein, the combination of an implement frame, a single furrow forming tool mounted thereon, and a damming device mounted on said implement frame and spaced laterally from said furrow forming tool and adapted to form dams in the furrow adjacent to the furrow being formed by said tool.

3. In combination with a tractor having traction wheels, a single furrow forming tool disposed intermediate said traction wheels and connected to said tractor, and a damming device mounted on said tractor to the rear of and in alignment with the furrowward traction wheel.

4. In combination with a tractor having traction wheels, an implement frame mounted on the rear of said tractor, a furrow forming tool mounted on said implement frame and disposed intermediate said traction wheels, and a damming device mounted on said implement frame and spaced laterally from said furrow forming tool, said damming device being disposed to the rear of and in alignment with the furrowward traction wheel.

5. In combination with a tractor having a pair of laterally spaced traction wheels, an implement of the class described for forming a single furrow with longitudinally spaced dams therein, said implement comprising a draft frame mounted on the rear of said tractor, a furrow forming tool mounted on said implement draft frame and disposed intermediate of said traction wheels, a pair of damming devices mounted on said implement frame on opposite sides of said furrow forming tool and disposed to the rear of and in alignment with each of said traction wheels, and means for holding either of said damming devices out of ground engaging position at option.

6. In combination with a tractor having laterally spaced traction wheels and an engine driven power lift mechanism, an implement draft frame disposed to the rear of said tractor, a single furrow forming tool mounted on said implement draft frame and disposed intermediate said traction wheels, a pair of damming devices mounted on said implement frame and disposed to the rear of and in alignment with said traction wheels, said damming devices comprising scraper blades movable between operative and inoperative positions and adapted to operate in the furrow formed by said furrow forming tool to accumulate soil from the sides thereof, disengageable detent means for holding said scraper blades in operative position, means responsive to the pressure of earth against said blade for disabling said detent and thereby allowing the blade to move into inoperative position, and means connecting said power lift mechanism with said damming devices for lifting the latter out of earth engaging position.

7. In combination with a tractor having laterally spaced traction wheels and an engine driven power lift mechanism, an implement draft frame disposed to the rear of said tractor, a single furrow forming tool mounted on said implement draft frame and disposed intermediate said traction wheels, a pair of damming devices mounted on said implement frame and disposed to the rear of and in alignment with said traction wheels, lifting means connecting said power lift with said damming devices for raising the latter out of earth engaging position, and detent means for optionally holding either of said damming devices out of earth engaging position.

8. In combination with a tractor having traction wheels, an implement of the class described, for forming a single furrow with longitudinally spaced dams therein, comprising a furrow forming tool mounted on said tractor intermediate said traction wheels, and a damming device mounted on said tractor to the rear of and in alignment with the furrowward traction wheel, said damming device comprising a transversely disposed shaft on which is rotatably mounted a scraper blade assembly, a detent member for holding said assembly against rotation as the damming device is drawn over the ground, said detent member being movable between operative and inoperative position, and a spring backed dashpot connected to said detent member for yieldingly holding said blade assembly against rotation as the damming device is moved forward.

9. In combination with a tractor having a pair of laterally spaced traction wheels, an implement draft frame disposed to the rear of said tractor, a furrow forming tool mounted on said draft frame midway between said traction wheels, and a pair of damming devices mounted on said draft frame on opposite sides of said furrow forming tool and disposed to the rear of and in alignment with said traction wheels, said damming devices being independently movable into and out of ground engaging position and each comprising a rotary scraper blade assembly, a detent member for holding said assembly against rotation as the damming device is drawn over the ground, said detent member being movable into and out of engagement with said assembly, resilient means for yieldingly holding said detent member in engagement with said assembly and adapted to yield to movement of said scraper blade assembly occasioned by pressure of accumulated earth, means for checking the return movement of said detent member into re-engagement with said assembly, and means for adjusting the rate of movement of said detent member in each direction.

10. In combination with a tractor having a pair of traction wheels, each wheel being spaced laterally from the center line of the tractor a distance substantially equal to a predetermined furrow spacing, an implement draft frame, a lister mounted on said implement frame midway between said traction wheels for opening a single furrow as the tractor runs with one of said traction wheels in the adjacent furrow, and a damming device mounted on said implement frame to the rear of the furrowward traction wheel and adapted to operate in the furrow in which the wheel runs, said damming device comprising a scraper blade adapted to accumulate soil from the sides of said furrow and deposit said accumulation to form dams.

11. In combination with a tractor having a pair of rubber tired traction wheels, each wheel being spaced laterally from the center line of the tractor a distance substantially equal to a predetermined furrow spacing, an implement draft frame mounted on the rear end of said tractor, a lister including planting mechanism mounted on said implement frame midway between said traction wheels, a pair of damming devices disposed on opposite sides of said lister to the rear of and in alignment with said traction wheels, each of said damming devices comprising a draft member connected to said implement frame for independent movement out of earth engaging position, a rotary scraper blade assembly comprising a plurality of blades disposed radially to the axis of rotation of said assembly, a disengageable detent member for holding said blade assembly against rotation as the damming device is moved forward over the ground, and means responsive to the pressure of accumulated earth against said blade assembly for disabling said detent to permit rotation of said blade assembly, and means for optionally holding either of said damming devices out of earth engaging position, whereby said single lister forms a furrow on the center line of the tractor and plants seed therein, one of said traction wheels running in the adjacent furrow formed on the preceding trip across the field, to pack the seeds by means of the rubber tire thereon, and said damming device behind the last mentioned wheel forming dams in said planted and packed furrow, the opposite damming device being held out of engagement with the unlisted ground.

12. In combination with a tractor having a pair of rubber tired traction wheels, each wheel being spaced laterally from the center line of the tractor a distance substantially equal to a predetermined furrow spacing, an implement draft frame mounted on the rear end of said tractor, a lister including planting mechanism mounted on said implement frame midway between said traction wheels, a pair of damming devices disposed on opposite sides of said lister to the rear of and in alignment with said traction wheels, each of said damming devices comprising a draft member connected to said implement frame for independent movement out of earth engaging position, a rotary scraper blade assembly comprising a plurality of blades disposed radially to the axis of rotation of said assembly, a disengageable detent member for holding said blade assembly against rotation as the damming device is moved forward over the ground, and a spring backed dashpot connected to said detent member for yieldingly holding said blade assembly against rotation occasioned by pressure of accumulated soil, and means for selectively holding either of said damming devices out of earth engaging position, whereby said single lister forms a furrow on the center line of the tractor and plants seed therein, one of said traction wheels running in the adjacent furrow formed on the preceding trip across the field, to pack the seeds by means of the rubber tire thereon, and said damming device behind the last mentioned wheel forming dams in said planted and packed furrow, the opposite damming device being held out of engagement with the unlisted ground.

13. In combination with a tractor having a pair of traction wheels, each wheel being spaced laterally from the center line of the tractor a distance substantially equal to a predetermined furrow spacing, an implement draft frame, a lister mounted on said implement frame midway between said traction wheels for opening a single furrow as the tractor runs with one of said traction wheels in the adjacent furrow, and a damming device mounted on said implement frame to the rear of the furrowward traction wheel and adapted to operate in the furrow in which the wheel runs, said damming device comprising a scraper blade member disposed in earth engaging position and rotatable out of said position by pressure of accumulated earth against said blade member as the latter is drawn forwardly, a detent member engaging said blade member for holding the latter against rotation, said detent member being disengageable from said blade member by movement of the latter under pressure of accumulated soil, a double acting spring backed dashpot connected to said detent member for yieldingly resisting movement of the latter out of engagement with said blade member and checking the return movement into re-engagement, and adjustable valve means for regulating the rate of movement of said detent member in each direction.

14. In combination with a tractor having a pair of laterally spaced rubber tired traction wheels and an engine driven power lift, an implement frame mounted on the rear of said tractor, a lister mounted on said implement frame midway between said traction wheels, a pair of damming devices disposed to the rear of and in alignment with said traction wheels, each of said damming devices comprising a draft member swingably connected to said implement frame for vertical movement relative thereto, a transversely extending rotatable shaft, a plurality of scraper blades rotatably mounted on said shaft in radial arrangement, a detent member, cam means disposed on said scraper blades for engaging said detent member to prevent rotation of the scraper blades as the damming device is moved forwardly over the ground, said detent member being movable out of engagement with said cam means, a two way spring backed dashpot connected to said detent member for resisting movement of the latter out of engagement with said cam means and for checking the return movement of the detent member to engagement with successive blade cam means, and adjustable valve means for regulating the rate of movement of said detent member in each direction, lifting means connecting said damming devices with said power lift for raising the damming devices out of earth engaging position, and detent means for selectively holding either of said damming devices out of earth engaging position.

15. A ground working implement comprising a wheel supported frame, a single furrow forming tool mounted on said frame, a pair of damming devices mounted on said frame on opposite sides of said tool and spaced laterally therefrom, said damming devices being movable vertically between ground engaging and transport positions, means for raising said damming devices out of ground engaging position, and means for holding either of said damming devices out of ground engaging position at option.

16. In combination with a tractor having a pair of laterally spaced traction wheels, a ground working implement comprising a draft frame mounted on the rear of said tractor, a furrow forming tool mounted on said draft frame and disposed intermediate of said traction wheels, a pair of damming devices disposed symmetrically on either side of said tool and spaced laterally therefrom, said damming devices being movable into and out of ground engaging position, means for raising said damming devices out of ground engaging position, and means for holding either of said damming devices out of ground engaging position, at option.

17. A ground working implement comprising, in combination, a wheel supported frame, a furrow forming tool mounted on said frame, a pair of damming devices mounted on said frame on opposite sides of said tool and spaced laterally therefrom a distance substantially equal to a predetermined furrow spacing, said damming devices being movable vertically into and out of ground engaging position, means for raising said damming devices out of ground engaging position, and means for holding either of said damming devices out of ground engaging position at option.

18. In combination with a tractor, a single furrow forming tool mounted on the rear of said tractor and disposed centrally between the driving members thereof, a pair of damming devices disposed symmetrically on either side of said tool and spaced laterally therefrom, said damming devices being movable vertically relative to said tractor, power lift means for raising said damming devices out of ground engaging position, and detent means for holding either of said damming devices in raised position, at option, after the other of said devices has been lowered by said power lift means.

19. In combination with a tractor having an engine driven power lift mechanism, a ground working implement comprising a single furrow forming tool mounted on the rear of said tractor and positioned substantially along the center line thereof, a pair of damming devices disposed symmetrically on opposite sides of said tool and spaced laterally therefrom a distance substantially equal to a predetermined furrow spacing, said damming devices being movable vertically relative to the tractor, means actuated by said power lift mechanism for raising said damming devices out of ground engaging position, and detent means for holding either of said damming devices in raised position at option.

20. In combination with a tractor having an engine driven power lift mechanism, a ground working implement comprising a draft frame mounted on the rear end of said tractor, a furrow forming tool connected to said draft frame for vertical movement relative thereto and positioned midway between the traction members of said tractor, a pair of dam forming tools disposed symmetrically on opposite sides of said furrow forming tool and spaced laterally therefrom a distance equal to a predetermined furrow spacing, said dam forming tools being connected to said draft frame for vertical movement relative thereto, means on said draft frame actuated by said power lift mechanism for raising all three tools simultaneously out of ground engaging position, and detent means for selectively holding either of said dam forming tools in raised position when the other tools are lowered.

21. A damming device comprising a wheel supported frame, a scraper blade adapted to be drawn in a furrow for scraping soil from the sides thereof and movable during forward travel to dumping position for depositing accumulated soil across the furrow to form a dam therein, draft means connecting said scraper blade to said frame for vertical movement relative thereto between ground engaging and transport positions, said draft means comprising a pair of parallel links for maintaining said scraper blade at a constant angle relative to the ground irrespective of the vertical position of the scraper blade with regard to the frame, and means for raising and holding said scraper blade in transport position.

22. In combination with a tractor having a pair of rubber tired traction wheels, each wheel being spaced laterally from the center line of the tractor a distance substantially equal to a predetermined furrow spacing, an implement draft frame mounted on the rear end of said tractor, a single lister including planting mechanism mounted on said implement frame midway between said traction wheels, a pair of damming devices disposed on opposite sides of said lister to the rear of and in alignment with said traction wheels, and means for optionally holding either of said damming devices out of earth engaging position, whereby said single lister forms a furrow on the center line of the tractor and plants seed therein, one of said traction wheels running in the adjacent furrow formed on the preceding trip across the field, to pack the seeds by means of the rubber tire thereon, and said damming device behind the last mentioned wheel forming dams in said planted and packed furrow, the opposite damming device being held out of engagement with the unlisted ground.

23. In a damming device of the class described, a blade member adapted to be drawn in a furrow for scraping soil from the sides thereof and movable to a dumping position for depositing said accumulated soil in the furrow to form a dam, a detent member, means yieldably urging said detent member into engagement with said blade for holding the same in operative position, said detent being moved out of engagement with the blade by pressure of the blade, dashpot means connected with said detent member for resisting movement of the latter out of engagement with said blade and for retarding return movement thereof, and means for independently regulating the resistance of said dashpot means in both directions of movement.

24. In an implement, a supporting frame, a tool carrying draft frame connected with said supporting frame for relative vertical movement, a lifting arm journaled on said supporting frame and having lost motion connection with said draft frame whereby the latter is raised when said lifting arm is raised, and a detent bar connected at one end with one of said frames and having means at the other end adapted to connect with the other of said frames, whereby said draft frame is supported in raised position after said lifting arm has been lowered.

25. In an implement, a frame, a draft member connected with said frame for vertical movement relative thereto, a lifting arm journaled on said frame for swinging movement in a vertical plane, lost motion means connecting said lifting arm with said draft member and adapted to raise the latter when the lifting arm is raised, and a detent bar connected with said draft member and adapted to connect with the frame when the draft member is raised whereby the latter is supported in raised position after the lifting arm has been lowered.

26. In an implement, a frame, a draft member connected with said frame for vertical movement relative thereto, a lifting arm journaled on said frame above said draft member for vertical swinging, lost motion means connecting said lifting arm with said draft member and adapted to raise the latter when the lifting arm is raised, a detent bar connected with said draft member and extending upwardly adjacent said lifting arm, and means on said detent bar adapted to engage said lifting arm when said draft member has been raised whereby the draft member may be held in raised position after said lifting arm has been lowered.

27. In an implement, a supporting member, a ground engaging tool, draft means connecting said tool with said supporting member for vertical movement between ground engaging and transport positions, a lifting arm journaled on said supporting member for rocking movement in a vertical plane, flexible means connecting said lifting arm with said draft means whereby the latter is raised to transport position when the lifting arm is raised, a detent bar connected with said draft means and extending closely adjacent the axis of rotation of said lifting arm, and means on said detent bar adapted to hook over said lifting arm when said draft means is in raised transport position for holding the draft means and associated ground engaging tool in transport position after said lifting arm has been lowered.

28. In an implement, a frame, a tool supporting draft member connected with said frame for vertical movement between ground engaging and transport positions, a lifting arm disposed above said draft member and journaled on said frame for vertical swinging movement, said lifting arm comprising a pair of laterally spaced parallel bars, flexible means connecting said lifting arm with said draft member, a detent bar connected with said draft member and extending upwardly between said spaced parallel bars adjacent the axis of rotation of said lifting arm, and a projecting lug on said detent bar adapted to catch on one of said parallel bars when the draft member is raised to transport position, whereby said draft member and associated tools are held in raised position.

29. In combination with a tractor, an implement comprising a transversely extending draft frame adapted to be mounted on the tractor, a furrow forming tool mounted on said draft frame substantially on the center line of the tractor, a pair of damming devices disposed on either side of said tool and spaced laterally therefrom, means connecting said damming devices to said draft frame providing for vertical movement into and out of ground engaging position, means for raising said damming devices, and means for holding either of said damming devices in raised position after the other damming device has been lowered.

30. In combination with a tractor having an engine driven power lift mechanism, an implement comprising a transversely extending draft frame adapted to be mounted on the tractor, a furrow forming tool mounted on said draft frame substantially on the center line of the tractor, a pair of damming devices disposed on either side of said tool and spaced laterally therefrom, means connecting said damming devices to said draft frame providing for vertical movement between ground engaging and transport positions, means connecting said damming devices with said power lift mechanism for raising the damming devices to transport position, and means for selectively holding either of said damming devices in transport position while the other damming device is lowered into ground engaging position.

31. A damming device comprising a draft frame, a scraper blade adapted to engage the soil at a predetermined working angle for accumulating soil as the device is drawn forwardly, said blade being movable to inoperative position for depositing the accumulated soil, and a pair of vertically spaced parallel draft bars connecting said scraper blade to said frame for vertical movement relative thereto, said draft bars being pivotally connected at their ends with the scraper blade and draft frame, respectively, whereby the scraper blade is maintained at said predetermined working angle for all vertical positions thereof.

32. A damming device comprising a draft frame, a rotary scraper assembly including blade means adapted to engage the soil at a predetermined working angle and rotatable to dumping position, a detent member movable into and out of engagement with said scraper assembly for holding said blade means at said working angle as the damming device is drawn forwardly over the ground, and a pair of vertically spaced fore and aft extending draft bars connecting said scraper assembly with said draft frame for relative vertical movement, each of said draft bars being pivotally connected at its ends with the scraper assembly and draft frame, respectively.

33. A damming device comprising a draft frame, a rotary scraper assembly including blade means adapted to engage the soil at a predetermined working angle and rotatable to dumping position, a detent member movable into and out of engagement with said scraper assembly for holding said blade means at said working angle as the damming device is drawn forwardly over the ground, and a pair of vertically spaced parallel fore and aft extending draft bars connecting said scraper assembly with said draft frame, each of said draft bars being pivotally connected at its front end with the draft frame and at its rear end with the scraper assembly, said draft bars serving to hold said scraper assembly in fixed angular relation to said draft frame for all vertical positions relative thereto.

EDGAR V. COLLINS.